Sept. 20, 1960   R. S. WEBER   2,953,081
ROTARY ROASTING IMPLEMENT
Filed Jan. 6, 1959
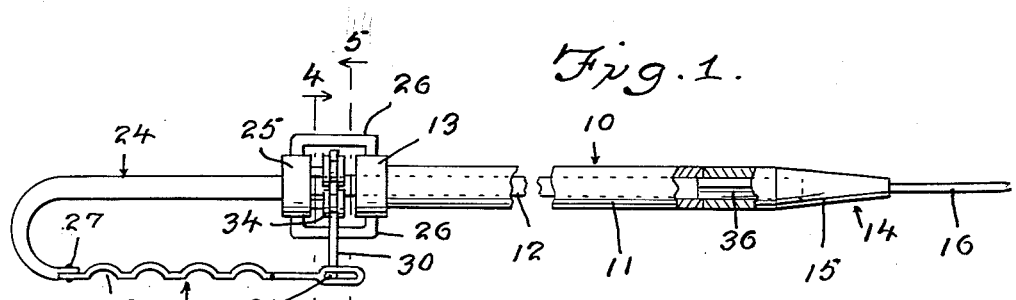
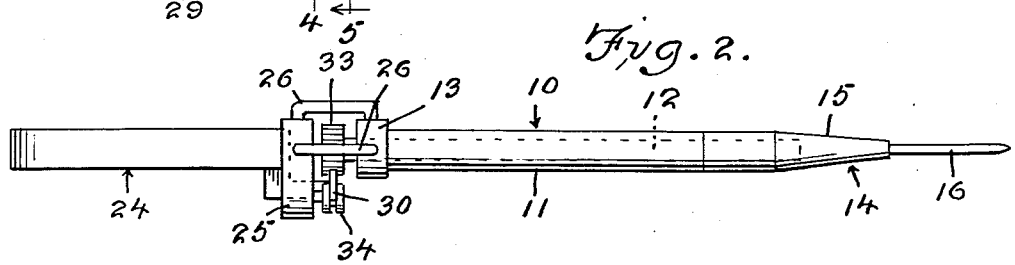
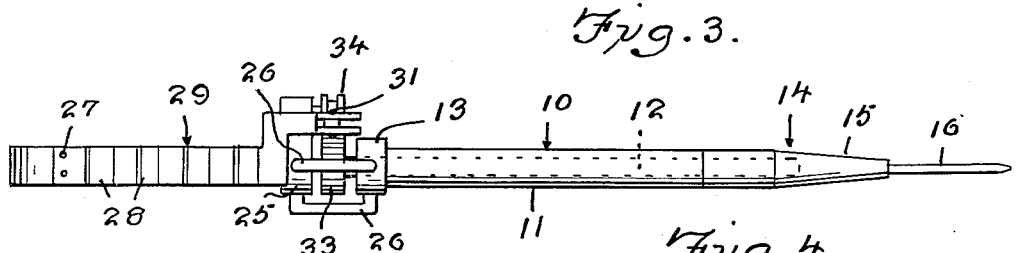
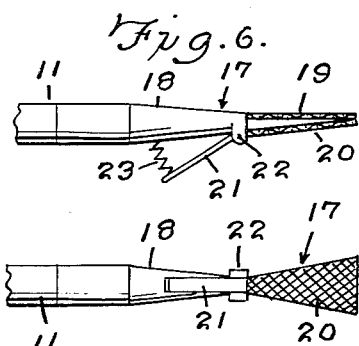
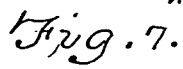
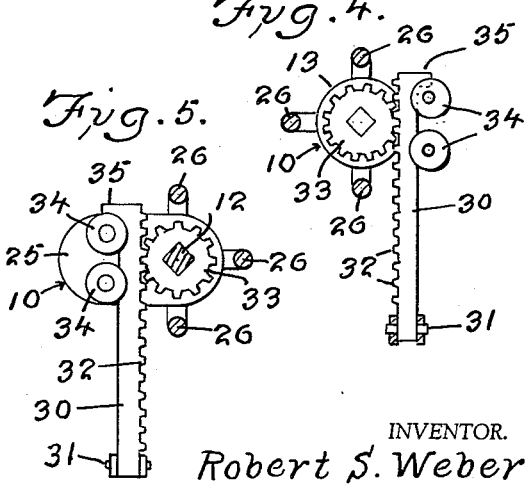
INVENTOR.
Robert S. Weber
BY
Victor J. Evans & Co.
ATTORNEYS United States Patent Office 2,953,081
Patented Sept. 20, 1960

2,953,081

ROTARY ROASTING IMPLEMENT

Robert S. Weber, Rapid City, S. Dak.
(2827 Magnolia St., Amarillo, Tex.)

Filed Jan. 6, 1959, Ser. No. 785,164

2 Claims. (Cl. 99—427)

This invention relates to an implement or tool for use in cooking or roasting foodstuffs.

The object of the invention is to provide an implement which is especially suitable for use in cooking or roasting various types of foodstuffs such as hot dogs, marshmallows, hamburgers or the like, and wherein a means is provided for readily and conveniently rotating the foodstuff so that all parts thereof can be thoroughly and evenly and uniformly cooked or roasted.

Another object of the invention is to provide a rotary roasting implement for use in cooking or roasting various types of food products, and wherein the tool of the present invention can be manipulated or operated by a simple one hand motion, and wherein various types of tips or tools can be used thereon.

A further object of the invention is to provide a rotary roasting implement which is extremely simple and inexpensive to manufacture.

Other objects and advantages will be apparent during the course of the following description.

In the accompanying drawings, forming a part of this application, and in which like numerals are used to designate like parts throughout the same:

Figure 1 is an elevational view of the rotary roasting implement of the present invention, with parts broken away and in section;

Figure 2 is a view taken at right angles to the view shown in Figure 1;

Figure 3 is an elevational view taken at right angles to the view shown in Figures 1 and 2;

Figure 4 is a sectional view taken on the line 4—4 of Figure 1;

Figure 5 is a sectional view taken on the line 5—5 of Figure 1;

Figure 6 is a fragmentary elevational view illustrating a modification; and

Figure 7 is a view taken at right angles to the view shown in Figure 6.

Referring in detail to the drawings, the numeral 10 indicates the rotary roasting implement of the present invention which comprises an elongated hollow tube 11 that has a shaft 12 rotatably mounted therein. A shoulder 13 is arranged on one end of the tube 11, and the numeral 14 indicates a tool which is detachably connected to an end of the shaft 12. The tool 14 includes a female coupling 15 which has a prong 16 extending therefrom, and the prong 16 may have a hot dog, marshmallow or the like thereon, as for example when such an article is to be cooked or roasted.

Instead of using the tool 14, a tool such as the tool 17 shown in Figures 6 and 7 may be used. The tool 17 is shown to comprise a female coupling 18 which is adapted to be mounted on the extended end of the shaft 12, and extending from the coupling 18 is a first jaw 19 and there is provided a second jaw 20 which is mounted for movement towards and away from the jaw 19. A lever portion 21 is connected to the movable jaw 20, and the lever portion 21 is pivotally supported as at 22, and a spring member 23 is provided for normally urging the jaw 20 towards the jaw 19.

The tool 10 further includes a hand grip 24 which has a collar 25 on an end thereof, and the collar 25 is connected to the shoulder 13 by means of connecting pieces 26. The numeral 29 indicates a spring member which has an end thereof connected to the hand grip 24 as at 27, and the spring member 29 is provided with a plurality of finger engaging portions 28.

The numeral 30 indicates a toothed rack which is connected to the spring member 29 as at 31, and the rack 30 is provided with teeth 32 which mesh with the teeth of a rotary pinion 33, and the pinion 33 is mounted on an end of the shaft 12. Guide members 34 are provided for maintaining the rack 30 in its proper alined position as it moves back and forth, and a stop member 35 is arranged on an end of the rack 30 for limiting travel of the rack 30 in one direction.

From the foregoing, it is apparent that there has been provided a tool which is especially suitable for use in roasting or cooking various types of foodstuffs. In use, the foodstuffs to be cooked or roasted are adapted to be arranged in engagement with the tool such as the tool 14 or the tool 17, and then the foodstuff can be conveniently held adjacent to a fire or other heating medium. By arranging the hand in engagement with the grip 24 and in engagement with the spring member 29, and by applying manual pressure thereto, the rack 30 can be shifted or moved. As the rack 30 moves, it is guided by the members 34 and as the rack 30 moves, its teeth 32 will cause rotation of the pinion 33. Since the pinion 33 is connected to the shaft 12, the shaft 12 will be rotated so that the tool 14 will turn, since the tool 14 is connected to an end of the shaft 12.

The prong 16 can engage a hot dog, marshmallow or the like. When the tool 14 is not needed, it can be readily detached from the end portion 36 of the shaft 12 and this tool can be replaced by a tool such as the tool 17. The tool 17 is especially suitable for use in cooking or roasting material such as hamburgers, since the hamburgers can be positioned between the jaws 19 and 20, and the spring 23 will maintain these jaws in closed position. However, when the hamburger is to be removed or replaced in the jaws, the lever portion 21 can be used to define a handle so as to overcome the pressure of the spring 23 whereby the hamburger can be conveniently inserted or removed.

The parts can be made of any suitable material and in different shapes or sizes.

If desired, the spring member 29 and hand grip 24 may be made of integral one-piece construction, and these parts can be of variable lengths as desired. The hand grip 24 is of sufficient width to provide holding stability and comfort and to provide efficient control. A suitable return spring can be provided for the member 29, and such a return spring may be so centered and related to the center of gravity to provide balance and to prevent rolling of the unit when held in the hand. The operating rack 30 is constructed and arranged so that it has no appreciable side-to-side play so that it has the proper amount of stability. The connection between the members 25 and 13 can vary as desired.

The implement of the present invention is adapted to simplify and modernize the roasting of hot dogs, marshmallows, hamburgers and the like over an open fire, and some of the advantages of the present invention are as follows. It operates with one hand and this is convenient as where a person is eating with the other hand or when the hands are used for any other purpose. The device assures even controlled roasting so that there will be no burning or raw places in the foodstuff and the device is easy to hold steady especially if the tube 11 is rested against a log, stone or other object so that the foodstuff will not be dunked in ashes or bumped against black grates or coals. The device is simple to operate and can be made so that it is highly attractive and suitable for indoor fireplaces as well as barbecue use indoors or out and it can be used in a handy and convenient manner for the preparation of meals, snacks or the like.

In operation, the movement of the rack 30 rotates the pinion 33 which drives the shaft 12 inside the tube 11 and full travel of the rack 30 may provide several revolutions of the pinion. The device may be provided with an auxiliary or adjustable spring which may be connected to the member 29 to provide a return action of the rack and reverse rotation of the pinion. The end portion 36 of the shaft 12 is exposed and defines a male part of the connection between the tool such as the tool 14 or the tool 17. The prong 16 can engage weiners and marshmallows or the like, and the jaws 19 and 20 may be used for holding a hamburger. The projection 35 limits reverse travel of the rack 30.

Minor changes in shape, size and rearrangement of details coming within the field of invention claimed may be resorted to in actual practice, if desired.

I claim:

1. In a rotary roasting implement, an elongated hollow tube, a shaft rotatably mounted in said tube, a shoulder on one end of said tube, a tool having a female coupling thereon for detachably connecting said tool to the end of said shaft that extends outwardly of the opposite end of said tube, a fixed jaw and a movable jaw extending therefrom forwardly thereof and a spring extending between said movable jaw and said coupling, a hand grip having a collar on one end thereof positioned at the opposite end of said shaft, connecting pieces extending between said collar and shoulder, a spring member on an end of said hand grip, a toothed rack connected to said spring member, guide members engaging said rack, and a pinion connected to an end of said shaft and meshing with said rack.

2. The structure as defined in claim 1, and further including a stop member on an end of said rack.

References Cited in the file of this patent

UNITED STATES PATENTS

| | | |
|---|---|---|
| 614,016 | Macduffee | Nov. 8, 1898 |
| 815,781 | Banks | Mar. 20, 1906 |
| 984,388 | Osner | Feb. 14, 1911 |
| 1,066,091 | Elkins | July 1, 1913 |
| 1,520,959 | Moore | Dec. 30, 1924 |
| 1,575,275 | Pearson | Mar. 2, 1926 |
| 2,315,143 | Thompson | Mar. 30, 1943 |
| 2,792,774 | Veach | May 21, 1957 |
| 2,827,848 | Alden | Mar. 25, 1958 |

FOREIGN PATENTS

| | | |
|---|---|---|
| 9,043 | Great Britain | Mar. 23, 1901 |
| 11,313 | Great Britain | May 13, 1909 |